(12) United States Patent
Zhang

(10) Patent No.: US 11,134,069 B2
(45) Date of Patent: Sep. 28, 2021

(54) METHOD FOR AUTHORIZING ACCESS AND APPARATUS USING THE METHOD

(71) Applicant: SONY CORPORATION, Tokyo (JP)

(72) Inventor: Zhihui Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 851 days.

(21) Appl. No.: 16/074,253

(22) PCT Filed: Apr. 13, 2016

(86) PCT No.: PCT/CN2016/079175
§ 371 (c)(1),
(2) Date: Jul. 31, 2018

(87) PCT Pub. No.: WO2017/036146
PCT Pub. Date: Mar. 9, 2017

(65) Prior Publication Data
US 2021/0006548 A1    Jan. 7, 2021

(30) Foreign Application Priority Data

Aug. 31, 2015 (CN) .......................... 201510547741.6

(51) Int. Cl.
*H04L 29/06* (2006.01)
*H04W 74/08* (2009.01)

(52) U.S. Cl.
CPC .............. *H04L 63/08* (2013.01); *H04L 63/10* (2013.01); *H04W 74/08* (2013.01)

(58) Field of Classification Search
CPC ......... H04L 63/08; H04L 63/10; H04W 74/08
See application file for complete search history.

(56) References Cited

U.S. PATENT DOCUMENTS

| 9,490,980 B2* | 11/2016 | Deshpande | ............. H04L 63/08 |
| 2005/0010760 A1* | 1/2005 | Goh | ........................ G16H 10/60 |
| | | | 713/161 |

(Continued)

FOREIGN PATENT DOCUMENTS

| CN | 101208952 A | 6/2008 |
| CN | 102271333 A | 12/2011 |

(Continued)

OTHER PUBLICATIONS

International Search Report and Written Opinion for PCT/CN2016/079175 dated Jun. 21, 2016.

*Primary Examiner* — Jeffrey C Pwu
*Assistant Examiner* — William A Corum, Jr.
(74) *Attorney, Agent, or Firm* — Xsensus LLP

(57) ABSTRACT

A method for authorizing access includes generating a public identity parameter and a private identity parameter for each server, and using the public identity parameter of a first server indicated by a first credential from a resource owner to perform identity encryption on the first credential and a first random parameter so as to generate and transmit a first request message to the first server. The private identity parameter is used to decrypt the first request message. The public identity parameter of a second server indicates by the second credential to perform identity encryption on the second credential and a second random parameter so as to generate and transmit a second request message. The second server uses the private identity parameter to perform decryption on the second request message, and the method determines, according to the decrypted second credential, a resource to be provided to the client.

21 Claims, 5 Drawing Sheets

(56) References Cited

U.S. PATENT DOCUMENTS

| | | | |
|---|---|---|---|
| 2005/0010801 A1* | 1/2005 | Spies | H04L 63/0442 |
| | | | 726/5 |
| 2010/0017593 A1* | 1/2010 | Putz | H04L 9/3073 |
| | | | 713/150 |
| 2010/0246827 A1* | 9/2010 | Lauter | G06F 21/6209 |
| | | | 380/278 |
| 2013/0179679 A1* | 7/2013 | Broustis | H04L 9/0822 |
| | | | 713/152 |
| 2015/0082025 A1* | 3/2015 | Deshpande | H04L 63/08 |
| | | | 713/155 |

FOREIGN PATENT DOCUMENTS

| | | |
|---|---|---|
| CN | 102484583 A | 5/2012 |
| WO | 2014201931 A1 | 12/2014 |

\* cited by examiner

METHOD FOR AUTHORIZING ACCESS AND APPARATUS USING THE METHOD

TECHNICAL FIELD

The present disclosure relates to a method for authorizing access and a device using the method for authorizing access, and in particular to a secure method for authorizing access using an identity-based encryption technology and a client device and a server device using the method.

BACKGROUND

Typically, a communication network consists of multiple interconnected nodes (network entities) capable of exchanging and processing information. During communication process, the network entities need to follow pre-established rules or standards, that is, network protocols.

In technology for authorizing access, when a certain entity in the network intends to access a certain resource, the entity needs to obtain the corresponding authorization. A authorization access protocol defines a process of authorizing and managing rights to access resources, and is a network protocol for authorization access process. It is to be noted that the resource herein refers to a variety of digital resources, such as data, image, audio, video and text.

As an authorization access protocol, Open Authorization (OAuth) protocol provides a secure, open and simple standard for authorizing access to the protected resources. According to the OAuth protocol, a third party can request to access the protected resources of a user without using account information (such as user name and password) of the resource owner (referred to as the user herein). Specifically, before accessing the protected resource, the third party needs to obtain authorization from the user first, then exchange the authorization for an access credential from an authorization server, and then present the access credential to a resource server to acquire the protected resource.

Currently OAuth 2.0 protocol is recommended, but OAuth 2.0 protocol itself does not provide a mechanism for protecting security for communication. That is, when it is required to access an important private resource of the user, the security of a communication process between the third party and the server can not be protected. Therefore, in applying OAuth 2.0 protocol, developers need to additionally implement a security mechanism for protecting confidentiality and integrity of communication.

Anuchart Tassanaviboon and Guang Gong proposed an OAuth-based AAuth protocol, which is an end-to-end encryption solution designed based on the ciphertext-policy attribute based encryption (CP-ABE). The AAuth protocol may completely replace the OAuth protocol, but the two protocols cannot be compatible with each other. Since the OAuth protocol is widely used currently, there are many difficulties in implementing the AAuth protocol in many existing application scenarios. For example, not only it is required to modify communication flow of the protocol, but also it is required to deal with the problem of binding backend data with access policy.

Therefore, there is a demand for an authorization access technology which is capable of providing a security protection mechanism and have good compatibility with the OAuth protocol.

SUMMARY OF INVENTION

In order to solve the above problems, it is proposed a secure authorization access technology based on OAuth 2.0 protocol and the identity-based encryption technology according to embodiments of the present disclosure. The technology does not need to modify communication flow of OAuth 2.0 protocol, and thus has good compatibility with OAuth 2.0 protocol. In a scenario currently using OAuth 2.0 protocol, the secure authorization access technology according to the embodiments of the present disclosure can be implemented only by simple upgrade. In addition to protecting the confidentiality of communication contents, the technology can protect the integrity of the communication contents.

The identity-based encryption technology used in the embodiments of the present disclosure belongs to a public key cryptosystem, and directly utilizes a unique identification of a network entity as a key without using a digital certificate. Compared with the traditional digital certificate-based public key system, the system using the identity-based encryption technology has a simpler structure.

It is provided a client device for accessing a resource based on an authorization access protocol according to an aspect of the present disclosure, which includes one or more processors configured to: when generating a request message required for accessing the resource, perform, using an identity-based encrypting method, identity-based encryption on a combination of a credential and a random parameter based on an identity of a server to which the request message is to be transmitted, and include the encrypted credential and the encrypted random parameter in the request message; and when processing a response message of the server with respect to the request message, decrypt a content of the response message by using the random parameter.

It is provided a server device executing an authorization access protocol according to another aspect of the present disclosure, which includes one or more processors configured to: perform identity-based decryption on a request message from a client based on an identity of the server device to acquire a credential and a random parameter; determine a content to be provided to the client based on the credential; and encrypt the content to be provided to the client by using the random parameter.

A method for authorizing access is provided according to another aspect of the present disclosure, which includes: generating, by a key generation center, a public identity parameter and a private identity parameter for each of one or more servers; performing, by a client, identity-based encryption on a combination of a first credential and a first random parameter by using a public identity parameter of a first server indicated by the first credential from a resource owner, to generate a first request message to be transmitted to the first server; decrypting, by the first server, the first request message by using a private identity parameter of the first server to acquire the first credential and the first random parameter, and generating a second credential to be provided to the client based on the first credential; performing, by the client, identity-based encryption on a combination of the second credential and a second random parameter by using a public identity parameter of a second server indicated by the second credential, to generate a second request message to be transmitted to the second server; decrypting, by the second server, the second request message by using a private identity parameter of the second server to acquire the second credential and the second random parameter, and determining a resource to be provided to the client based on the second credential.

BRIEF DESCRIPTION OF THE DRAWINGS

The present disclosure may be better understood with reference to the following description given in conjunction with the drawings, in which, same or similar reference numerals are used throughout the drawings to refer to the same or like parts. The drawings, together with the following detailed description, are included in this specification and form a part of this specification, and are used to further illustrate preferred embodiments of the present disclosure and to explain the principles and advantages of the present disclosure. In the drawings.

DETAILED DESCRIPTION OF THE EMBODIMENTS

Figure 1:
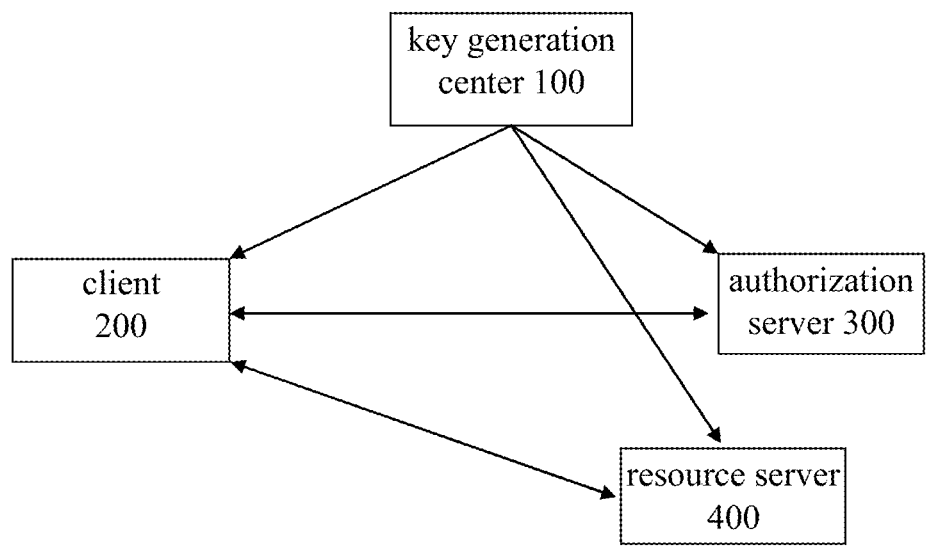
FIG. 1 is a schematic structural diagram of an authorization access system according to an embodiment of the present disclosure.

FIG. 1 shows a schematic structure of an authorization access system according to an embodiment of the present disclosure. As shown in FIG. 1, the system includes a key generation center 100, a client 200, an authorization server 300, and a resource server 400.

The key generation center 100 generates a secret identity parameter (an identity key) for each of the authorization server 300 and the resource server 400 and transmits the secret identity parameter to the authorization server 300 and the resource server 400 in a secure manner (e.g., by physical transport). In addition, the key generation center 100 further generates a public identity parameter for each of the authorization server 300 and the resource server 400 and publishes the public identity parameter to the client 200. Specifically, the public identity parameter may be automatically transmitted to the client 200, or may be announced. In a latter case, the public identity parameters of the authorization server 300 and the resource server 400 are obtained by the client 200 via active inquiry.

The public identity parameter generated by the key generation center 100 may be represented as follows:

$$T_i = g^{t_i}, Y = e(g,g)^y$$

In addition, the secret identity parameter $D_i$ generated by the key generation center 100 may be represented as follows:

$$D_i = g^{\frac{y}{t_i}}$$

In the above expressions, $t_i$ (i=1, 2, ..., n) is a random integer in the $Z_p$ domain, and $t_i$ (i=1, 2, ..., n) indicates identifications $ID_1, ID_2, ..., ID_n$ (where n is the number of servers) of servers, and y is a random integer in the $Z_p$ domain.

The client 200 may request authorization from a resource owner (i.e., a user, not shown) to access a protected resource of the user. After obtaining the authorization of the user, the client 200 requests the authorization server 300 to verify the authorization. When the verification is successful, the authorization server 300 transmits an access credential (AC) to the client 200. Then the client 200 requests the protected resource to be accessed from the resource server 400 by using the access credential AC. The resource server 400 transmits the requested resource to the client 200 after successfully verifying the access credential AC. This process is consistent with a flow of OAuth 2.0 protocol. Therefore, the present technology is compatible with OAuth 2.0 protocol.

It should be noted that, although the authorization server and resource server are shown as different servers in FIG. 1, they may be the same server. That is, the functions of verifying the authorization and providing the requested resource are realized by the same server. In this case, the processes of issuing the access credential AC and verifying the access credential AC may be omitted, that is, the requested protected resource can be provided to the client 200 after the server successfully verifies the user authorization provided by the client 200.

An authorization access method capable of providing a security protection mechanism according to an embodiment of the present disclosure will be described in detail below with reference to FIG. 2.

Figure 2:
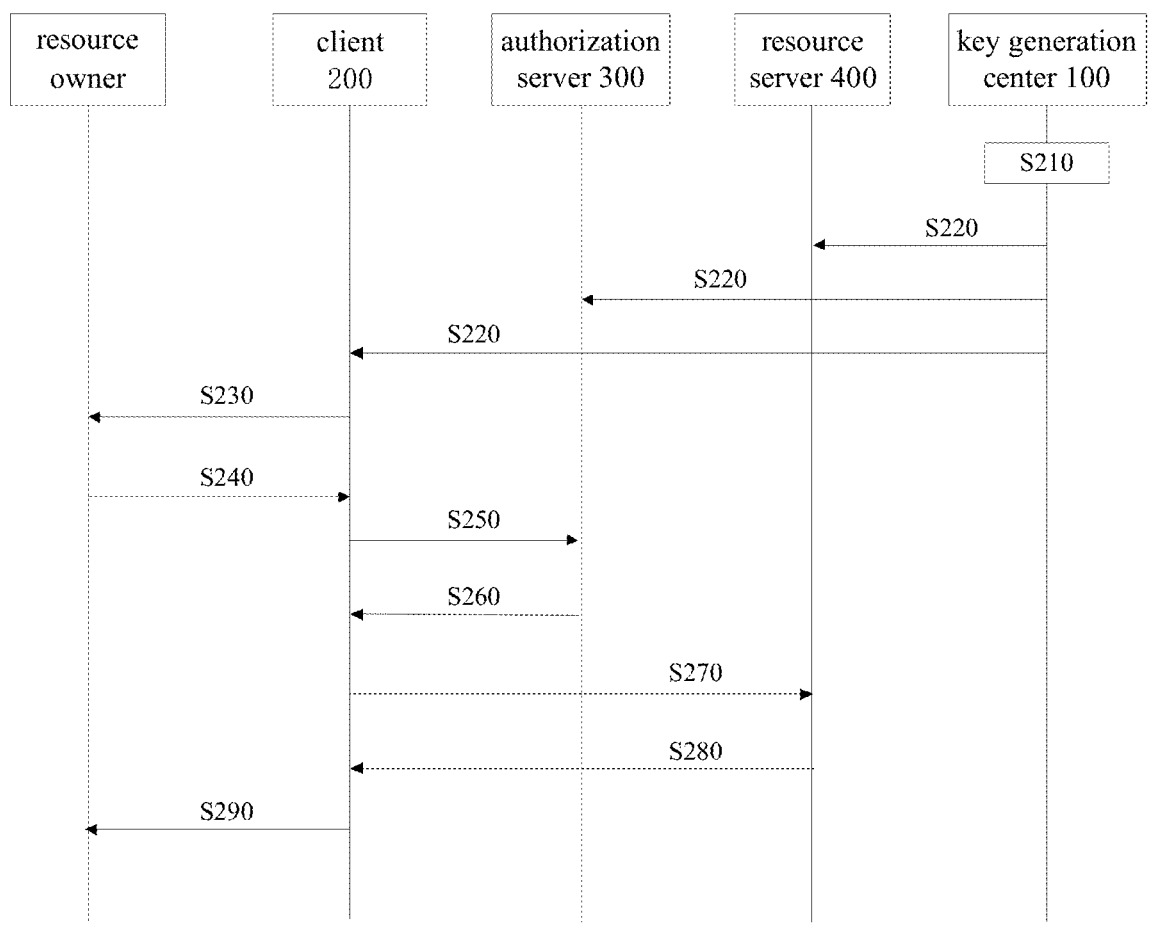
FIG. 2 is a schematic diagram of a secure authorization access flow according to an embodiment of the present disclosure.

Reference is made to FIG. 2, in step S210, the key generation center 100 generates the secret identity parameters and the public identity parameters for the authorization server 300 and the resource server 400 respectively, and in step S220, the key generation center 100 securely transmits the generated secret identity parameters to the authorization server 300 and the resource server 400, and publishes the generated public identity parameters to the client 200.

The client 200 transmits an authorization grant request message to the user in step S230 in a case that the client 200 intends to access a specific resource owned by the user. The authorization grant request message includes target information to be accessed (e.g., IP address, Uniform Resource Locator URL, server ID, etc.), resources to be accessed (e.g., data, image, video, audio, text, and application program), and authorization period and so on.

The user generates a valid authorization grant (AG) in response to the request message of the client 200, and provides the authorization grant AG to the client 200 in step S240. The authorization grant AG includes the same contents as described above, such as the target information to be accessed, the resource to be accessed, and the authorization period.

It is to be noted that the authorization grant AG may be either directly generated by the user or may be generated after the user interacts with the authorization server 300, depending on a specific application scenario.

After obtaining the authorization grant AG the client 200 requests, from the authorization server 300, the access credential AC for accessing the resource by using the authorization grant AG in step S250. This request message will be transmitted to the authorization server 300 in an encrypted manner. The processing of generating an access credential request message by the client 200 is described in detail hereinafter.

First, the client 200 determines the public identity parameters $T_i$ and Y of the authorization server 300 based on the target information indicated in the authorization grant AG (which is assumed as the ID of the authorization server 300 in the embodiment). In addition, the client 200 generates a random session key $K_1$.

Then, the client 200 generates a request message for requesting an access credential from the authorization server 300 through the following calculation:

The authorization grant AG and the random session key $K_1$ are merged, $AG\|K_1$, as a content to be encrypted; $AG\|K_1$ is encrypted, and ciphertext is obtained as follows:

Ciphertext=$(AG\|K_1)\cdot Y^{r_1}$, where $r_1$ is a random integer in the $Z_p$ domain;

An attribute parameter $E_i$ related to the identity of the authorization server 300 is calculated as follows:

$$E_i = T_i^{r_1};$$

The request message for requesting the access credential AC is obtained as follows:
(ciphertext, attribute parameter)=(ciphertext, $E_i$).

The processing of generating the access credential request message according to the identity-based encryption technology is described above, and the confidentiality of the transmitted authorization grant AG and the random session key $K_1$ can be protected by the processing. In addition, a HASH algorithm or a message authentication code (MAC) may be used to further ensure the integrity of the transmitted content.

For example, the access credential request message may be generated through the following calculation in the case of using the HASH algorithm:
A digest of the content $AG\|K_1$ to be encrypted is calculated by using the HASH algorithm as follows:

$$H(AG\|K_1)$$

The ciphertext Ciphertext and the attribute parameter $E_i$ are calculated as described above;
The request message is obtained as follows:

(digest, ciphertext, attribute parameter) = 
$(H(AG\|K_1), \text{Ciphertext}, E_i) = (H(AG\|K_1), (AG\|K_1)\cdot Y^{r_1}, E_i = T_i^{r_1}).$ Reference is made to FIG. 2, the authorization server 300 decrypts the request message by using the secret identity parameter $D_i$ acquired from the key generation center 100 upon the receipt of the access credential request message of the client 200. The specific calculation is as follows:
calculating $$e(D_i, E_i) = e\left(g^{\frac{y}{t_i}}, g^{t_i \cdot r_1}\right) = e(g, g)^{y \cdot r_1};$$

calculating $$\frac{(AG\|K_1)\cdot Y^{r_1}}{e(g,g)^{y \cdot r_1}} = AG\|K_1$$

to restore the encrypted content of the client 200.

Optionally, the authorization server 300 verifies the integrity of the content accordingly after decrypting the request message, in a case that the access credential request message transmitted by the client 200 contains information for verifying the integrity (digest). For example, the authorization server 300 performs hash operation H $(AG\|K_1)$ on the restored content $AG\|K_1$. If the calculated value is equal to a value of the digest included in the request message, integrity verification is successful. Otherwise, it is indicated that the integrity of the contents of $AG\|K_1$ is not reliable, thereby terminating the operation.

The authorization server 300 further decomposes $AG\|K_1$ to obtain the authorization grant AG and the random session key $K_1$ after obtaining $AG\|K_1$. Then, the authorization server 300 generates the corresponding access credential AC based on the contents of the AG. The access credential may include, for example, an identifier, a resource, and an allowance period of a target server that the client 200 is allowed to access.

The authorization server 300 encrypts the access credential AC by using the random session key $K_1$ obtained from the decryption, $E_{K_1}(AC)$, and transmits the encrypted access credential to the client 200 in step S260. The encryption method E( ) may be any known secure encryption algorithm.

As an example, the process that the client 200 communicates with the authorization server 300 to acquire the access credential AC is described above. According to the present technology, in a case that the authorization grant AG obtained from the user indicates multiple target authorization servers 300, the client 200 may request the access credential AC from the multiple authorization servers 300 simultaneously. That is, the client 200 may transmit the same access credential request message to the multiple authorization servers 300, and the multiple authorization servers 300 that have received the request message feed back the respective access credential AC to the client 200 after processing the request message.

Specifically, if it is assumed that the authorization grant AG indicates m target authorization servers 300 whose identifiers are $ID_1, ID_2, \ldots, ID_m$ respectively, the client 200 generates the following access credential request message and transmits the access credential request message to the m authorization servers 300, (digest, ciphertext, attribute parameter)=$(H(AG\|K_1), (AG\|K_1)\cdot Y^r, \{E_i = T_i^r\}_{i \in m})$.

Upon reception of the above-described request message, the m target authorization servers 300 decrypt the request message by using the respective secret identity parameter $D_i$, and calculate to obtain the authorization grant AG and the random session key $K_1$. Then, the access credential AC is generated based on the content of the authorization grant AG and the access credential AC is encrypted by using the random session key $K_1$ and then is transmitted to the client 200.

It is to be noted that there are two cases as follows: (1) the m authorization servers 300 can process authorization grants AG with the same format and content, and thus the above-described access credential request message is generated by encrypting the single authorization grant AG; and (2) the m authorization servers 300 support the authorization grants AG with different formats or contents, and therefore the above-described access credential request message is generated by encrypting a set of the multiple authorization grants AG. In this case, different authorization grants AG are transformed or encrypted and then combined together, and identity encryption is performed on the combined authorization grant, thereby generating an access credential request message. Accordingly, it is avoided a possibility that one authorization server 300 obtains all the authorization grants AG after decrypting the request message, that is, the authorization server 300 can only process its own authorization grant AG, thereby ensuring the security.

As described above, the client 200 may request the access credential AC from multiple authorization servers simultaneously via the same request message, thereby simplifying the processing and providing system operation efficiency.

Referring back to FIG. 2, the client 200 performs decryption by using the random session key $K_1$ after obtaining the encrypted access credential from the authorization server 300, thereby obtaining the access credential AC. Then the client 200 requests the resource to be accessed from the resource server 400 by using the access credential AC in step S270. The process of generating the resource request message by the client 200 will be described in detail below.

First, the client 200 determines the public parameters $T_j$ and Y corresponding to the resource server 400 based on the target server indicated in the access credential AC (assuming as the resource server 400 in the present embodiment). In addition, the client 200 generates a random session key $K_2$.

Then, the client 200 generates a request message for requesting a resource from the resource server 400 through the following calculation:
The access credential (AC) and the random session key $K_2$ are merged, $AC\|K_2$, as the content to be encrypted;
$AC\|K_2$ is encrypted, and ciphertext is obtained as follows:

Ciphertext=$(AC\|K_2)\cdot Y^{r_2}$, where $r_2$ is a random integer in the $Z_p$ domain;

An attribute parameter $E_j$ related to the identity of the resource server 400 is calculated as follows:

$E_j = T_j^{r_2}$;

The request message for requesting the resource is obtained as follows:
(ciphertext, attribute parameter)=(Ciphertext, $E_j$).

Optionally, a HASH algorithm or a message authentication code (MAC) may be further used to ensure the integrity of the transmitted content. For example, the following resource request message may be obtained in the case of using the HASH algorithm:

(digest, ciphertext, attribute parameter)=($H(AC\|K_2)$, $(AC\|K_2)\cdot Y^{r_2}$, $E_j=T_j^{r_2}$).

Then, the client 200 transmits the generated resource request message to the resource server 400 in step S270.

The resource server 400 decrypts the request message by using the secret identity parameter $D_j$ acquired from the key generation center 100 upon the receipt of the resource request message of the client 200. The specific calculation is as follows:
calculating $$e(D_j, E_j) = e\left(g^{\frac{y}{t_j}}, g^{t_j \cdot r_2}\right) = e(g, g)^{y \cdot r_2};$$

and
calculating $$\frac{(AC\|K_2) \cdot Y^{r_2}}{e(g, g)^{y \cdot r_2}} = AC\|K_2,$$

to restore the encrypted content of the client 200.

The resource server 400 verifies the integrity of $AC\|K_2$ after decrypting the resource request message, in a case that the resource request message transmitted by the client 200 contains information for verifying the integrity. The verification process is similar to the previous verification performed by the authorization server 300. In a case that the integrity verification is not successful, the operation is terminated.

If the integrity verification is successful, the resource server 400 further decomposes $AC\|K_2$ to obtain the access credential AC and the random session key $K_2$. Then the resource server 400 encrypts the resource indicated in the access credential AC by using the random session key $K_2$ and provides the encrypted resource to the client 200 in step S280. The encryption algorithm may be any known secure encryption algorithm.

The client 200 decrypts the content provided by the resource server 400 by using the random session key $K_2$, to obtain plaintext information of the required resource, and presents the plaintext information to the user in step S290.

The authorization access flow according to the embodiment of the present disclosure is described above with reference to FIG. 2, and steps S230 to S290 in the flow are consistent with the flow of OAuth 2.0 protocol. Therefore, according to the embodiments of the present disclosure, a security protection mechanism is provided for OAuth 2.0 protocol without changing the flow of the protocol, thereby greatly simplifying the upgrade for a developer.

Functional modules of the client and the server according to the embodiment of the present disclosure will be described below with reference to FIG. 3 and FIGS. 4A to 4B respectively.

Figure 3:
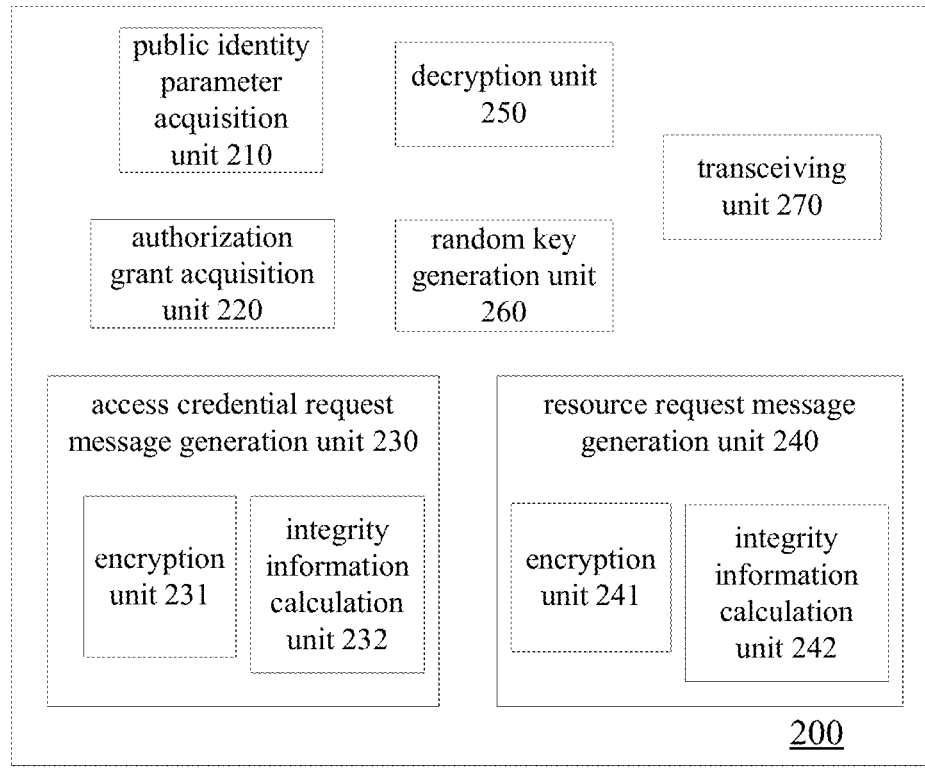
FIG. 3 is a schematic diagram of functional modules of a client according to an embodiment of the present disclosure.

As shown in FIG. 3, the client 200 includes a public identity parameter acquisition unit 210, an authorization grant acquisition unit 220, an access credential request message generation unit 230, a resource request message generation unit 240, a decryption unit 250, a random key generation unit 260 and a transceiving unit 270.

The public identity parameter acquisition unit 210 is configured to acquire a public identity parameter of the authorization server 300 or the resource server 400 which is generated by the key generation center 100, and the public identity parameter is to be used when an access credential request message or a resource request message is generated.

The authorization grant acquisition unit 220 is configured to acquire the authorization grant AG from the user.

The access credential request message generation unit 230 is configured to generate an encrypted access credential request message to transmit to the corresponding authorization server 300 via the transceiving unit 270. As shown in FIG. 3, the access credential request message generation unit 230 includes an encryption unit 231 and an integrity information calculation unit 232. The encryption unit 231 encrypts the obtained authorization grant AG and the random session key $K_1$ generated by the random key generation unit 260 by using the identity-based encryption technology. The integrity information calculation unit 232 computes information for integrity verification based on a combination of the authorization grant AG and the random session key $K_1$. The generated access credential request message includes the encrypted authorization grant AG and the encrypted random session key $K_1$, and the information for integrity verification.

The resource request message generation unit 240 is configured to generate an encrypted resource request message to transmit to the corresponding resource server 400 via the transceiving unit 270. The resource request message generation unit 240 includes an encryption unit 241 and an integrity information calculation unit 242. The encryption unit 241 encrypts the obtained access credential AC and the random session key $K_2$ generated by the random key generation unit 260 by using the identity-based encryption technology. The integrity information calculation unit 242 computes information for integrity verification based on a combination of the access credential AC and the random session key $K_2$. The generated resource request message includes the encrypted access credential AC and the encrypted random session key $K_2$, and the information for integrity verification.

The decryption unit 250 decrypts the information from the authorization server 300 and the information from the resource server 400 respectively by using the random session key $K_1$ and the random session key $K_2$ generated by the random key generation unit 260, to obtain the access credential AC and the plaintext information of the required resource.

The transceiving unit 270 is configured to perform signal transmission and reception between the client 200 and other devices or network entities.

It should be noted that the client 200 may not include the integrity information calculation units 232 and 242 in the case of not considering to ensure the integrity of the communication content.

Figure 4A:
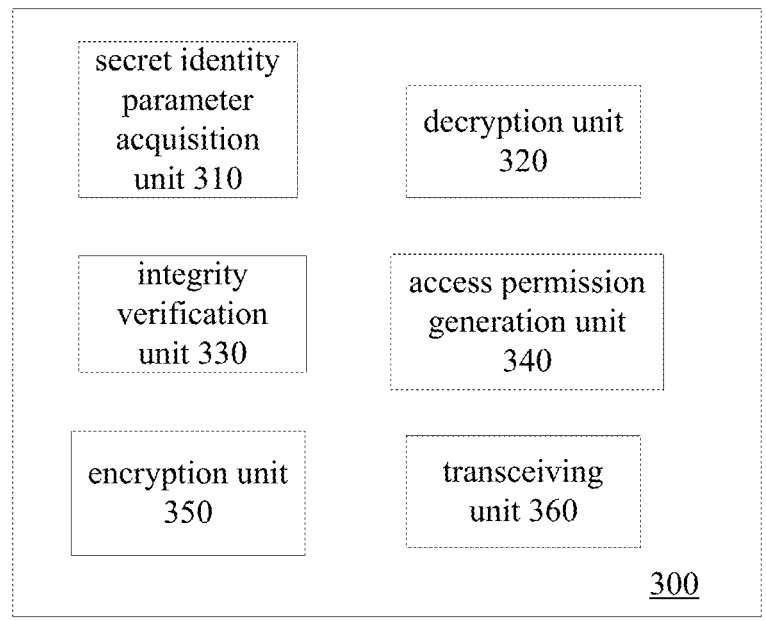
FIGS. 4A and 4B are schematic diagrams of functional modules of an authorization server and a resource server according to an embodiment of the present disclosure.
Figure 4B:
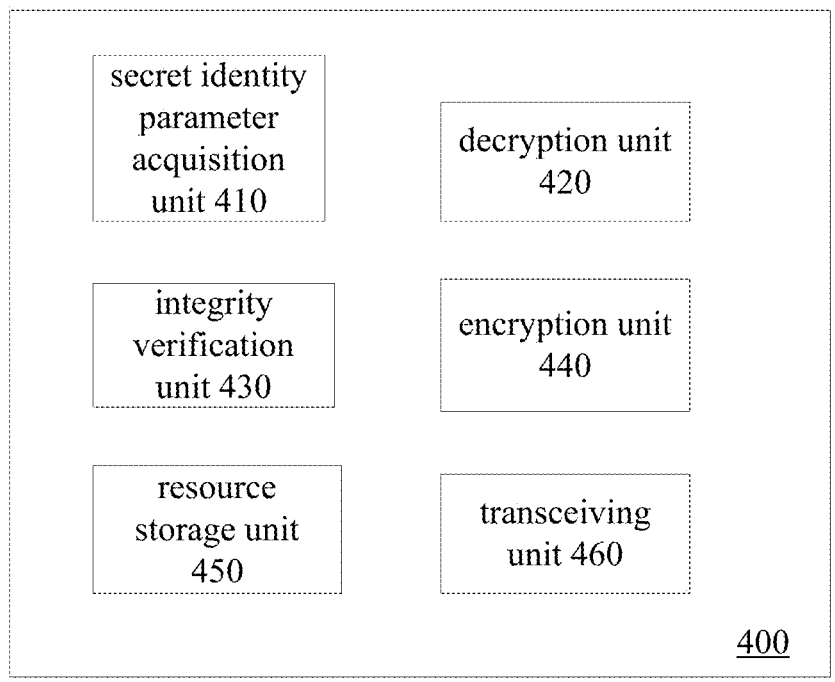

FIGS. 4A and 4B show functional modules of the authorization server 300 and the resource server 400 respectively. As shown in FIG. 4A, the authorization server 300 includes a secret identity parameter acquisition unit 310, a decryption unit 320, an integrity verification unit 330, an access credential generation unit 340, an encryption unit 350 and a transceiving unit 360.

The secret identity parameter acquisition unit 310 acquires the secret identity parameter generated by the key generation center 100 for the authorization server 300. The decryption unit 320 decrypts the access credential request message from the client 200 by using the secret identity parameter to obtain the authorization grant AG and the random session key $K_1$. The integrity verification unit 330 may verify the integrity of the obtained authorization grant AG and the random session key $K_1$. When the integrity verification is successful, the access credential generation unit 340 may generate the corresponding access credential AC based on the authorization grant AG After the encryption unit 350 encrypts the access credential AC by using the obtained random session key $K_1$, the transceiving unit 360 transmits the encrypted AC to the client 200.

As shown in FIG. 4B, the resource server 400 includes a secret identity parameter acquisition unit 410, a decryption unit 420, an integrity verification unit 430, an encryption unit 440, a resource storage unit 450, and a transceiving unit 460.

The secret identity parameter acquisition unit 410 acquires the secret identity parameter generated by the key generation center 100 for the resource server 400. The decryption unit 420 decrypts the resource request message from the client 200 by using the secret identity parameter to obtain the access credential AC and the random session key $K_2$. The integrity verification unit 430 may verify the integrity of the obtained access credential AC and the random session key $K_2$. When the integrity verification is successful, the encryption unit 440 encrypts the requested resource stored in the resource storage unit 450 by using the obtained random session key $K_2$, and the transceiving unit 460 transmits the encrypted resource to the client 200.

It should be noted that the authorization server 300 and the resource server 400 may not include the integrity verification units 330 and 430 in the case of not considering to ensure the integrity of the transmission content.

The secure authorization access method and the client and the server using the method according to the embodiment of the present disclosure are described above in conjunction with the drawings. The present disclosure may be applied to the fields such as medical, power, and communication.

A specific application example of an embodiment of the present disclosure will be described below by an example of a medical field. Generally, a medical institution (such as a hospital) stores medical data of a user, such as a case. With the technology according to the present disclosure, a third party service organization may obtain such data from the medical institution in a secure manner and provide the data to the user, in the case of obtaining authorization of the user.

Figure 5:
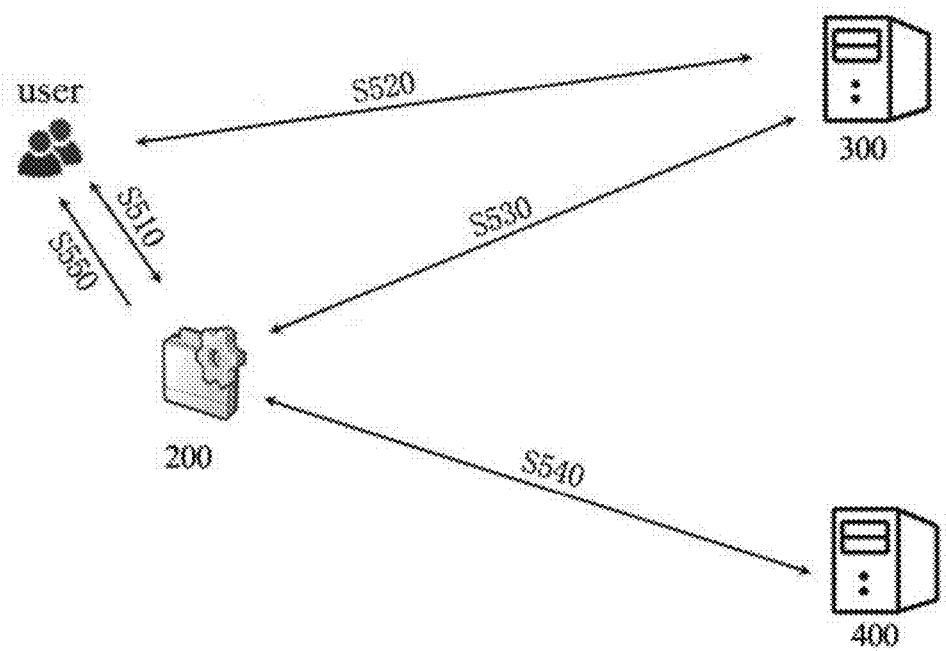
FIG. 5 illustrates a specific example of applying the embodiment of the present disclosure in medical field.

Referring to FIG. 5, in step S510, the user logs in a client 200 of the third party service organization, and selects a service item. The client 200 requests an authorization grant AG from the user based on the service item selected by the user. In this case, the user may interact with the authorization server 300 (e.g., a server of a hospital) in step S520 to obtain the authorization grant AG and provide the AG to the client 200 (not shown). It is to be noted that the authorization grant AG may also be obtained by the user in advance by interacting with the authorization server 300. Therefore, the user can provide the obtained authorization grant AG to the client 200 upon receiving a request from the client 200.

Then, as shown in step S530, the client 200 requests the access credential AC from the authorization server 300 of the medical institution by using the obtained authorization grant AG The authorization server 300 transmits the corresponding access credential AC to the client 200 after verifying the authorization grant AG The processes for encrypting and generating the access credential request message are described as above and are not described here.

Then, as shown in step S540, the client 200 requests a medical data resource from the resource server 400 (e.g., the server of the hospital) by using the obtained access credential AC. The resource server 400 supplies the corresponding resource to the client 200 after verifying the access credential AC. The encryption and generation processes for the resource request message are described as above.

Finally, the client 200 sorts and presents the data resource to the user in step S550.

The data obtained by the user may be, for example, medical consumption of the user for the whole year. In this case, the client 200 accesses the medical institutions where medical consumption of the user occurs, and synthesizes the obtained data and presents it to the user. For example, the data obtained by the user may also be all the testing results in a certain medical cycle. In this case, the client 200 may process the obtained data to form a schematic diagram to present to the user.

In the above-described communication process of accessing the medical data of the user, the data is transmitted in an encrypted form, thereby ensuring the security and effectively preventing leakage of the privacy information of the user.

Similarly, the power department, the communication operator, or the like also saves the personal data or records of the user. The user can easily view his own data information via the client of the third party service organization by using the secure authorization access technology according to the present disclosure.

The devices or modules described herein are logical and do not strictly correspond to physical devices or entities. For example, the function of each module described herein may be implemented by multiple physical entities, or the functions of the multiple modules described herein may be implemented by a single physical entity.

A series of processes performed by each device or module in the above embodiments may be implemented by software, hardware, or a combination of software and hardware. The programs included in the software may be stored in advance in the storage medium provided inside or outside each device. As an example, during execution, these programs are written into random access memory (RAM) and executed by a processor (e.g., CPU).

Figure 6:
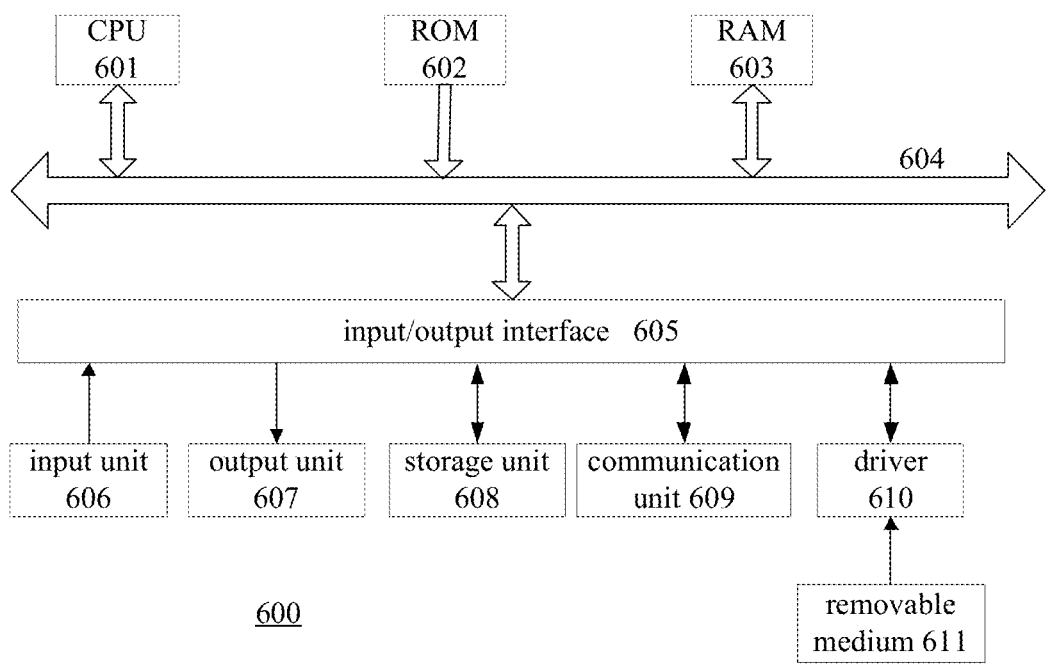
FIG. 6 is a block diagram illustrating an exemplary configuration of computer hardware for implementing an embodiment of the present disclosure.

FIG. 6 is a block diagram illustrating an exemplary configuration of computer hardware that performs the above-described processing based on a program.

In a computer 600, a central processing unit (CPU) 601, a read-only memory (ROM) 602 and a random access memory (RAM) 603 are connected to each other via a bus 604.

An input/output interface 605 is further connected to the bus 604. The input/output interface 605 is connected to the following components: an input unit 606, such as a keyboard, a mouse, a microphone; an output unit 607, such as a display, a speaker; a storage unit 608, such as a hard disk, a nonvolatile memory; a communication unit 609, such as a network interface card (such as a local area network (LAN) card, a modem); and a driver 610 for driving a removable medium 611, such as a magnetic disk, an optical disk, a magneto-optical disk, or a semiconductor memory.

In the computer having the above-described structure, the CPU 601 loads the program stored in the storage unit 608 into the RAM 603 via the input/output interface 605 and the bus 604, and executes the program to perform the above-described processing.

The program to be executed by the computer (CPU 601) can be recorded on the removable medium 611 as a packaging medium, such as a magnetic disk (including a floppy disk), an optical disk (including a compact disc read-only memory (CD-ROM)), a digital versatile disc (DVD) or the like), a magneto-optical disk, or a semiconductor memory. In addition, the program to be executed by the computer (CPU 601) may also be provided via a wired or wireless transmission medium such as a local area network, the Internet, or a digital satellite broadcast.

When the removable medium 611 is installed in the drive 610, the program may be installed in the storage unit 608 via the input/output interface 605. In addition, the program may be received by the communication unit 609 via a wired or wireless transmission medium, and the program may be installed in the storage unit 608. Alternatively, the program may be pre-installed in the ROM 602 or the storage unit 608.

The program to be executed by the computer may be a program that executes the processing in the order described in the present specification, or may be a program that executes the processing in parallel or executes the processing when necessary (for example, when being called).

Although the embodiments and technical effects of the present disclosure have been described in detail in combination with the drawings above, the scope of the present disclosure is not limited thereto. It should be understood by those skilled in the art that, depending on design requirements and other factors, various modification or changes can be made to the embodiments discussed herein without departing from the principle and spirit of the present disclosure. The scope of the present disclosure is defined by the appended claims and the equivalents thereof.

In addition, the embodiments of the present disclosure may be configured as follows.

A client device for accessing a resource based on an authorization access protocol is provided, which includes one or more processors configured to: when generating a request message required for accessing the resource, perform, using an identity-based encrypting method, identity-based encryption on a combination of a credential and a random parameter based on an identity of a server to which the request message is to be transmitted, and include the encrypted credential and the encrypted random parameter in the request message; and when processing a response message of the server with respect to the request message, decrypt a content of the response message by using the random parameter.

The one or more processors are further configured to: compute information for verifying integrity for the combination of the credential and the random parameter; and include the computed information in the request message.

The credential is a first credential from a resource owner, and the first credential includes an identifier of a first server that the owner authorizes the client device to access, a resource that the client device is authorized to access, and an authorization valid period.

The one or more processors are further configured to: perform identity-based encryption on a combination of the first credential and a first random parameter based on the identity of the first server to generate a first request message.

The first server includes multiple first servers, and the one or more processors are further configured to: perform identity-based encryption based on identities of the multiple first servers to generate the first request message for the multiple first servers simultaneously.

The one or more processors are further configured to decrypt a content of a response message from the first server by using the first random parameter to acquire a second credential, where the second credential includes an identifier of a second server which the client is allowed to access, a resource which the client is allowed to access, and an allowance valid period.

The one or more processors are further configured to perform identity-based encryption on a combination of the second credential and a second random parameter based on the identity of the second server, to generate a second request message for the second server.

The one or more processors are further configured to decrypt a content of a response message from the second server by using the second random parameter to acquire the resource to be accessed.

The first server is a different server from the second server.

The first server is the same server as the second server.

The identities of the first server and the second server include public identity parameters generated by a key generation center for the first server and the second server.

A server device executing an authorization access protocol is provided, which includes one or more processors configured to: perform identity-based decryption on a request message from a client based on an identity of the server device to acquire a credential and a random parameter; determine a content to be provided to the client based on the credential; and encrypt the content to be provided to the client by using the random parameter.

The one or more processors are further configured to: verify integrity of the acquired credential and random parameter, after performing the decryption.

The one or more processors are further configured to: perform identity-based decryption on a first request message from the client to acquire a first credential and a first random parameter, where the first credential includes an identifier of a server that a resource owner authorizes the client to access, a resource that the client is authorized to access, and an authorization valid period; and generate a second credential to be provided to the client based on the first credential, wherein the second credential includes an identifier of a server which the client is allowed to access, a resource which the client is allowed to access, and an allowance valid period.

The one or more processors are further configured to encrypt the second credential to be provided to the client by using the acquired first random parameter.

The one or more processors are further configured to perform identity-based decryption on a second request message from the client to acquire the second credential and a second random parameter; and determine a resource to be provided to the client based on the second credential.

The one or more processors are further configured to encrypt the resource to be provided to the client by using the acquired second random parameter.

The identity of the server includes a private identity parameter generated by a key generation center for the server.

A method for authorizing access is provided, which includes: generating, by a key generation center, a public identity parameter and a private identity parameter for each of one or more servers; performing, by a client, identity-based encryption on a combination of a first credential and a first random parameter by using a public identity parameter of a first server indicated by the first credential from a resource owner, to generate a first request message to be transmitted to the first server; decrypting, by the first server, the first request message by using a private identity parameter of the first server to acquire the first credential and the first random parameter, and generating a second credential to be provided to the client based on the first credential; performing, by the client, identity-based encryption on a combination of the second credential and a second random parameter by using a public identity parameter of a second server indicated by the second credential, to generate a second request message to be transmitted to the second server; decrypting, by the second server, the second request message by using a private identity parameter of the second server to acquire the second credential and the second random parameter, and determining a resource to be provided to the client based on the second credential.

The first credential indicates multiple first servers, and the client performs encryption by using public identity parameters of the multiple first servers, to generate the first request message to be transmitted to the multiple first servers simultaneously.

The client computes information for verifying integrity for the combination of the first credential and the first random parameter and the combination of the second credential and the second random parameter respectively; the first server verifies the integrity of the first credential and the first random parameter which are acquired after the decryption based on the information; and the second server verifies the integrity of the second credential and the second random parameter which are acquired after the decryption based on the information.

The first server encrypts the second credential to be provided to the client by using the first random parameter; and the client decrypts the encrypted second credential by using the first random parameter.

The second server encrypts the resource to be provided to the client by using the second random parameter; and the client decrypts the encrypted resource by using the second random parameter.

The first server is a different server from the second server.

The first server is the same server as the second server.

The resource includes one or more of data, image, video, audio, text and application program.

The invention claimed is:

1. A client device configured to access a resource based on an authorization access protocol, the client device configured to operate in a communication network and comprising one or more processors configured to:
obtain a grant for access to the resource;
based on the obtained grant, obtain an access credential from an authorization server;
generate a resource request message to access the resource from a resource server that stores the resource;
when generating the resource request message to access the resource,
based on an identity of the resource server, perform an identity-based encryption on a combination of the access credential and a random session key generated by the client device; and
include the encrypted combination of the access credential and the random session key in the request message;
transmit the resource request message to the resource server;
in reply to the resource request message, receive and process a response message of the resource server; and
when processing the response message of the resource server,
decrypt a content of the response message by using the random session key to obtain the resource,
wherein the access credential is a first access credential comprising an identifier of a first resource server that a resource owner device authorizes the client device to access, an identifier of a resource of the first resource server that the client device is authorized to access, and an authorization valid period.

2. The client device according to claim 1, wherein the one or more processors are further configured to:
determine information for enabling the resource server to verify integrity for the combination of the access credential and the random session key; and
include the computed information in the request message.

3. The client device according to claim 1, wherein the one or more processors are further configured to:
perform identity-based encryption, based on the identity of the first server, on a combination of the first access credential and a first random session key to generate a first request message; and
perform identity-based encryption based on identities of a plurality of the first servers to generate the first request message for the plurality of the first servers simultaneously.

4. The client device according to claim 3,
wherein the one or more processors are further configured to decrypt a content of a response message from the first server by using the first random session key to acquire a second access credential,
wherein the second access credential comprises an identifier of a second server which the client is allowed to access, a resource which the client is allowed to access, and an allowance valid period, and
wherein the one or more processors are further configured to perform identity-based encryption, based on the identity of the second server, on a combination of the second access credential and a second random session key, to generate a second request message for the second server.

5. The client device according to claim 4, wherein the one or more processors are further configured to decrypt a content of a response message from the second server by using the second random session key to acquire the resource to be accessed.

6. The client device according to claim 4, wherein the first server is a different server from the second server.

7. The client device according to claim 4, wherein the first server is the same server as the second server.

8. The client device according to claim 4, wherein the identities of the first server and the second server comprise public identity parameters generated by a key generation center for the first server and the second server.

9. The client device according to claim 1, wherein the obtaining the access credential comprises:
    based on an identity of the authorization server, performing an identity-based encryption on a combination of the grant and another random session key generated by the client device, the another random session key being different from the random session key;
    transmitting the encrypted combination of the grant and the another random session key to the authorization server;
    receiving an identity-based encrypted combination of the access credential and the another random session key from the authorization server; and
    perform an identity-based decryption of the combination of the access credential and the another random session key to obtain the access credential.

10. The client device according to claim 9,
    wherein the obtaining the grant comprises:
    based on an identity of the resource owner device, performing an identity-based encryption on a combination of a grant request and the another random session key generated by the client device;
    transmitting the encrypted combination of the grant request and the another random session key to the resource owner device;
    receiving an identity-based encrypted combination of the grant and the another random session key from the resource owner device; and
    perform an identity-based decryption of the combination of the grant and the another random session key to obtain the grant.

11. A method by a client device configured to access a resource based on an authorization access protocol, the client device configured to operate in a communication network and comprising one or more processors, the method comprising:
    obtaining a grant for access to the resource;
    based on the obtained grant, obtaining an access credential from an authorization server;
    generating a resource request message to access the resource from a resource server that stores the resource;
    wherein the generating the resource request message to access the resource includes:
    based on an identity of the resource server, performing an identity-based encryption on a combination of the access credential and a random session key generated by the client device; and
    including the encrypted combination of the access credential and the random session key in the request message;
    transmitting the resource request message to the resource server; and in reply to the resource request message, receiving and processing a response message of the resource server,
    wherein the processing the response message of the resource server includes decrypting a content of the response message by using the random session key to obtain the resource,
    wherein the access credential is a first access credential comprising an identifier of a first resource server that a resource owner device of the resource authorizes the client device to access, an identifier of a resource of the first resource server that the client device is authorized to access, and an authorization valid period.

12. The method according to claim 11, further comprising:
    determining information for enabling the resource server to verify integrity for the combination of the access credential and the random session key; and
    including the computed information in the request message.

13. The method according to claim 11, further comprising:
    performing identity-based encryption, based on the identity of the first server, on a combination of the first access credential and a first random session key to generate a first request message; and
    performing identity-based encryption based on identities of a plurality of the first servers to generate the first request message for the plurality of the first servers simultaneously.

14. The method according to claim 13, further comprising:
    decrypting a content of a response message from the first server by using the first random session key to acquire a second access credential,
    wherein the second access credential comprises an identifier of a second server which the client is allowed to access, a resource which the client is allowed to access, and an allowance valid period; and
    performing identity-based encryption, based on the identity of the second server, on a combination of the second access credential and a second random session key, to generate a second request message for the second server.

15. The method according to claim 14, further comprising:
    decrypting a content of a response message from the second server by using the second random session key to acquire the resource to be accessed.

16. The method according to claim 14, wherein the first server is a different server from the second server.

17. The method according to claim 14, wherein the first server is the same server as the second server.

18. The method according to claim 14, wherein the identities of the first server and the second server comprise public identity parameters generated by a key generation center for the first server and the second server.

19. The method according to claim 11, wherein the obtaining the access credential comprises:
    based on an identity of the authorization server, performing an identity-based encryption on a combination of the grant and another random session key generated by the client device, the another random session key being different from the random session key;

transmitting the encrypted combination of the grant and the another random session key to the authorization server;

receiving an identity-based encrypted combination of the access credential and the another random session key from the authorization server; and perform an identity-based decryption of the combination of the access credential and the another random session key to obtain the access credential.

20. The method according to claim 19, wherein the obtaining the grant comprises:

based on an identity of the resource owner device, performing an identity-based encryption on a combination of a grant request and the another random session key generated by the client device;

transmitting the encrypted combination of the grant request and the another random session key to the resource owner device;

receiving an identity-based encrypted combination of the grant and the another random session key from the resource owner device; and perform an identity-based decryption of the combination of the grant and the another random session key to obtain the grant.

21. A non-transitory computer-readable medium containing instructions for a method to be performed by a client device configured to access a resource based on an authorization access protocol, the client device configured to operate in a communication network and comprising one or more processors, the method comprising:

obtaining a grant for access to the resource;

based on the obtained grant, obtaining an access credential from an authorization server;

generating a resource request message to access the resource from a resource server that stores the resource;

wherein the generating the resource request message to access the resource includes:

based on an identity of the resource server, performing an identity-based encryption on a combination of the access credential and a random session key generated by the client device; and including the encrypted combination of the access credential and the random session key in the request message;

transmitting the resource request message to the resource server; and in reply to the resource request message, receiving and processing a response message of the resource server, wherein the processing the response message of the resource server includes decrypting a content of the response message by using the random session key to obtain the resource, wherein the access credential is a first access credential comprising an identifier of a first resource server that a resource owner device of the resource authorizes the client device to access, an identifier of a resource of the first resource server that the client device is authorized to access, and an authorization valid period.

* * * * *